United States Patent
Okonkwo et al.

(10) Patent No.: US 10,018,746 B2
(45) Date of Patent: Jul. 10, 2018

(54) RESTORABLE ANTENNAE APPARATUS AND SYSTEM FOR WELL LOGGING

(71) Applicant: OLIDEN TECHNOLOGY, LLC, Sugar Land, TX (US)

(72) Inventors: Chidiebele Gabriel Okonkwo, Houston, TX (US); Qiming Li, Sugar Land, TX (US); Anzong Li, Shaanx (CN); Chuanwei Li, Shaanx (CN); Jun Zhu, Shaanx (CN)

(73) Assignees: Oliden Technology, LLC, Sugar Land, TX (US); China National Petroleum Corporation, Beijing (CN)

( * ) Notice: Subject to any disclaimer, the term of this patent is extended or adjusted under 35 U.S.C. 154(b) by 0 days.

(21) Appl. No.: 14/936,956

(22) Filed: Nov. 10, 2015

(65) Prior Publication Data

US 2016/0061985 A1 Mar. 3, 2016

Related U.S. Application Data

(63) Continuation of application No. 13/849,231, filed on Mar. 22, 2013, now Pat. No. 9,213,124.

(51) Int. Cl.
| | |
|---|---|
| *G01V 3/28* | (2006.01) |
| *G01V 13/00* | (2006.01) |
| *E21B 47/01* | (2012.01) |
| *G01V 3/30* | (2006.01) |
| *H01Q 1/40* | (2006.01) |
| *H01Q 7/04* | (2006.01) |

(52) U.S. Cl.
CPC .............. *G01V 3/28* (2013.01); *E21B 47/011* (2013.01); *G01V 3/30* (2013.01); *G01V 13/00* (2013.01); *H01Q 1/40* (2013.01); *H01Q 7/04* (2013.01); *Y10T 29/49018* (2015.01)

(58) Field of Classification Search
None
See application file for complete search history.

(56) References Cited

U.S. PATENT DOCUMENTS

| | | | | |
|---|---|---|---|---|
| 6,084,052 A | * | 7/2000 | Aufdermarsh | E21B 47/011 156/160 |
| 7,436,183 B2 | * | 10/2008 | Clark | E21B 47/122 324/338 |

* cited by examiner

*Primary Examiner* — Jermele M Hollington
*Assistant Examiner* — Douglas X Rodriguez
(74) *Attorney, Agent, or Firm* — Bryan L. White

(57) ABSTRACT

An apparatus includes a sub with recesses along an exterior wall to receive inserts, an antenna case including a coil surrounded by a sacrificial wear portion of a material through which signals between the coil and a formation of interest may pass. An eroded outer wall of the sacrificial wear portion is restorable by application of an uncured restorative material to the antenna case. A method includes securing an antenna case having a coil there within onto a sub, surrounding the coil with a metal sleeve shield, and radially receiving and securing a multi-piece sacrificial wear member intermediate the antenna case and a retainer ring having a threaded bore. The multi-piece sacrificial wear member is replaceable after use by unthreading the retainer ring to release the sacrificial wear member for radial removal from the sub.

20 Claims, 14 Drawing Sheets

RESTORABLE ANTENNAE APPARATUS AND SYSTEM FOR WELL LOGGING

CROSS-REFERENCE TO RELATED APPLICATIONS

This application is a continuation application of U.S. patent application Ser. No. 13/849,231, filed Mar. 22, 2013, and claims, under 35 U.S.C. § 120, priority to that application and all rights and benefits accorded thereby.

BACKGROUND OF THE INVENTION

Field of the Invention

The present invention relates to an apparatus, system and method for logging wells to obtain well information and to improve directional steering of bores drilled to a targeted geologic formation. More specifically, the present invention relates to a re-usable antenna assembly including a sacrificial wear member to protect an element within the antenna assembly.

Background of the Related Art

Well logging devices are included in well logging assemblies that are made up into a drill string and lowered into a drilled earthen bore to detect conditions in a geologic formation penetrated by the bore. The detected conditions generally indicate the presence and/or absence of certain recoverable fluids that reside in the pores of the rock that makes up the geologic formation. Well logging assemblies include devices that generate a signal aimed at and transmitted into a geologic formation of interest adjacent to the bore in which the well logging assembly is deployed. Well logging assemblies also include devices that sense or detect a signal reflected by or returned from an adjacent geologic formation of interest. Some well logging assemblies include a first well logging device to induce an electrical current to flow within the geologic formation of interest and a second well logging device to measure the resulting current flow in the formation. The measurement of the resulting current flow enables the determination of the electrical resistivity of materials residing within pores of the formation of interest. For example, a high resistance to current flow generally indicates that a non-conductive fluid, such as hydrocarbon oil or gas, resides in the pores of the formation, and a low resistance to current flow generally indicates that a conductive fluid, such as brine or water, resides in the pores of the formation.

In some applications, the spacing of a first, signal-generating well logging device on a well logging assembly relative to a second, signal-detecting well logging device on the well logging assembly determines the depth of investigation; that is, the spacing between the first and second well logging devices determines the distance into the formation, and from the bore in which the tool is deployed, that is being investigated using the well logging devices. A greater separation of the first well logging device from the second well logging device provides a greater distance into the geologic formation from the bore that is investigated, and a lesser separation of the first well logging device from the second well logging device provides a lesser distance into the formation from the bore that is investigated.

It is advantageous to provide elements on a well logging assembly that protect the well logging devices assembled thereon without impairing the performance of the well logging devices. Antenna assemblies used in well logging may be used to both transmit a signal from a well logging assembly into the formation of interest, and also to receive a responsive signal from the formation of interest to the well logging assembly. These antenna assemblies generally require non-conductive elements either to provide a path through which a signal can pass and/or to provide an insulation barrier so that an electric potential can be applied across the non-conductive element of the well logging assembly. There is a tension between providing high-strength and durable elements, such as metal protective sleeves, to surround and protect well logging devices, and maintaining insulating elements to enable the well logging devices to function efficiently; that is to transmit and receive signals. Non-conductive materials that do not impair the function of the well logging device antenna may be subject to erosion and wear when used to protect well logging devices that are included in well logging assemblies.

BRIEF SUMMARY OF THE INVENTION

The present invention provides a well logging method, apparatus and system to investigate the condition and/or content of a subsurface geologic formation penetrated by an earthen bore into which a well logging assembly is introduced. The well logging assembly can include a plurality of well logging devices. For example, a first well logging device may be disposed on a sub at a first spacing from a second well logging device on the sub, and the first well logging device may be used to transmit a signal to a formation of interest while the second well logging device may be used to receive a conditioned signal from the formation of interest.

The well logging method, apparatus and system of the present invention enable an unobstructed signal path between a well logging device and a formation of interest being penetrated by an earthen bore being extended using a drill string in which the well logging devices are included. More specifically, the method, apparatus and system of the present invention enable the re-use of a well logging assembly that includes a sacrificial wear member providing a generally unobstructed radiation path between the well logging device and the formation of interest.

One embodiment of the well logging method, apparatus and system comprises an elongate sub having a bore for fluid flow and a plurality of recesses along the external wall of the sub to enable the securing of one or more well logging devices, such as antenna cases, to the sub in a manner that enables coils within the antenna cases to transmit a signal into and/or receive a signal from the adjacent geologic formation of interest. Detectable changes in the signal transmitted into the formation from an antenna case (coil), or detectable changes in the signal received from the formation of interest at an antenna case, indicates the nature and character of materials residing within the pores of the geologic formation adjacent to the antenna case. The radiation path between the transmitting and/or receiving coil and the formation of interest passes through a non-metal antenna case or other sacrificial component of an antenna assembly that is not surrounded by a metal wear member during use, and therefore remains unimpaired in its capacity to emit and/or detect radiation directed through the path. For other antenna, it is required for certain part of the antenna assembly exposed to a hostile subsurface drilling environment and subject to wear to be non-conductive to electrical current. The non-metal antenna case or other sacrificial component of the antenna assembly is, in one embodiment of a method of the present invention, subject to erosion and material loss during the drilling process, and the sacrificial component is subsequently restorable or replenishable to an original configuration by controlled application of a conforming material to the eroded face of the sacrificial component. In another embodiment an apparatus and system of the present invention, the eroded sacrificial component of the antenna assembly is conveniently and easily replaceable with a new sacrificial component.

The structure of the antenna case, and the manner in which the antenna case is secured to the sub determine the effectiveness of the coil of the antenna case in emitting and/or receiving and detecting a signal providing characterization of the formation properties. While components on a drill string are generally formed of high strength materials, such as steel, the antenna case and the sacrificial portion or sacrificial member should comprise a non-conducting material such as, for example, glass, plastic, and a composite material. In one embodiment of the apparatus and system of the present invention, the sacrificial portion of the antenna assembly is a non-signal obstructing material known as E-glass epoxy composite. In another embodiment of the apparatus and system of the present invention, the sacrificial portion of the antenna assembly is a non-signal obstructing material known as S-glass epoxy composite. Both E-glass and S-glass epoxy composites are types of fiberglass that comprise high-strength glass fibers in the range of 5 to 25 micrometers in diameter. Both E-glass and S-glass epoxy composites are types of fiberglass that are replenishable or restorable in accordance with one embodiment of the present invention.

An antenna case to be used as a transceiver in a well logging assembly may therefore comprise a conductive wire coil encased within a generally non-conductive, protective material with conductive leads connecting a first end and a second end of the coil to a power source, such as a battery, to electrically excite the coil and to thereby generate and transmit an electromagnetic signal from the excited coil and into the adjacent formation of interest. Alternately, the coil may be connected to an amplification circuit and a processor to receive a signal from the formation of interest, amplify the received signal and feed the amplified signal to a processor for analysis. An antenna assembly having an antenna case containing a coil connected to a power source, an amplifier and a processor may be operated in multiple modes. In a first mode, the antenna assembly may act as a transmitter by using the power source to provide a current flow to excite the coil. The current flow in the coil produces an electromagnetic field around the coil that is directed, by strategic configuration of the well logging device and the well logging assembly into which the device is incorporated, into a geologic formation adjacent to the bore in which the antenna assembly is deployed. A transceiver may be operated in a second mode as a receiver by using the processor to detect, record and/or condition (amplify) signals generated by one or more other well logging devices operated as transmitters and flowing through the geologic formation of interest to reach the transceiver (operating as a receiver). It will be understood that the condition of the signals detected by the transceiver operating in the second mode reflects the nature and character of the components and materials of the geologic formation through which the signals flow from the source (i.e. a transceiver operating as a transmitter) to the detecting transceiver (operating as a receiver).

DETAILED DESCRIPTION OF THE INVENTION

Figure 1:
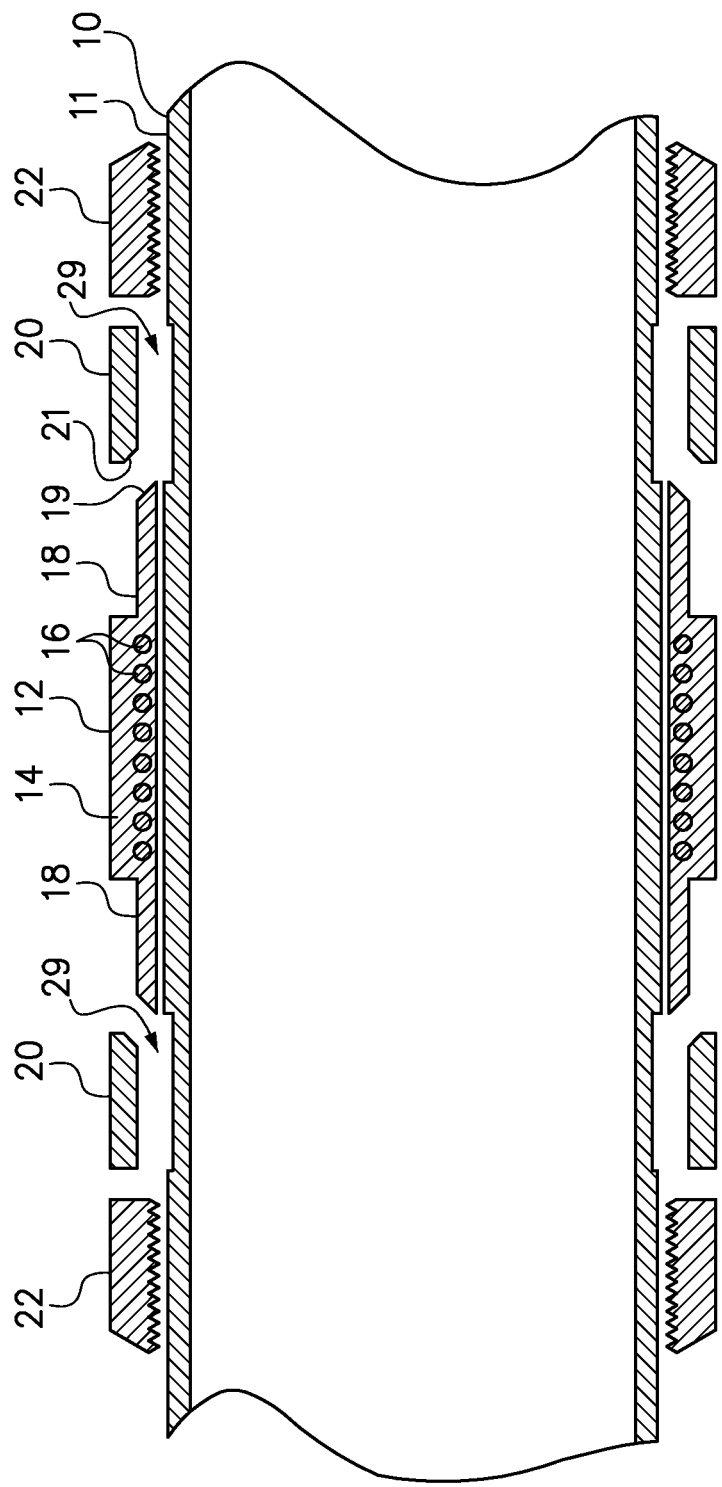
FIG. 1 is a sectioned view of a sub on which an antenna case component of the antenna assembly of the present invention is received intermediate a pair of straddling wear bands and intermediate a pair of straddling retainer rings.

One embodiment of the present invention provides a sub adapted for being connected within a drill string used for drilling an earthen bore and for being fitted with one or more signal-generating devices and one or more signal-detecting devices disposed on the sub at a known spacing relative to the one or more signal-generating devices. In one embodiment of the present invention, a transceiver may be used as both a signal-generating device and also as a signal-detecting device. In one embodiment, a first transceiver comprises a generally sleeve-shaped apparatus having a coil of conductive wire wound within a coil section and encased in a generally non-conductive material. Electrically conductive leads from the coil may be connected to a power source, such as a battery, to cause an electrical current to flow in the coil and in the circuit into which the coil is connected along with the power source. The current flowing in the coil generates an electromagnetic field that penetrates an adjacent geologic formation of interest when the drill string is used to extend an earthen bore. The coil in the antenna case can be, in one embodiment, in the form of a uniform, repeating loop of wire winding within the antenna case or, in another embodiment, wound in the form of a toroid around a ring of highly permeable magnetic materials employed in lateral-type of tools for logging while drilling applications. In another embodiment, the antenna coil can be a pre-formed printed-circuit type producing field patterns of a desirable type and shape.

In operation, a first transceiver, having a coil encased within a non-conductive material, is disposed on a sub at a known position to function as a transmitter. A second transceiver, also having a coil encased within a non-conductive material, is disposed on the sub at a known spacing relative to the first transceiver. The coil of the second transceiver functions, in one mode, as an antenna to receive signals transmitted into the adjacent formation of interest by the first transceiver, conditioned by the materials residing in the formation and detected at the second transceiver. The leads of the second transceiver are connected to an instrument that detects and conditions the signals from the adjacent geologic formation. The signals detected at the second transceiver are altered and/or conditioned by materials comprising the formation of interest, and the altered and/or conditioned nature of the detected signals can be used to determine the nature and character of the components of the formation that caused the alteration or conditioning of the signals. For example, hydrocarbon gas or oil stored in the pores of the geologic formation will affect the signal generated by the first transceiver and detected by the second transceiver in a first way, while a highly conductive material, such as water, stored in the pores of the geologic formation will affect the signal generated by the first transceiver and detected by the second transceiver in another way. The nature of the alteration or conditioning of the signals, and the extent to which a signal generated by the first transceiver and detected at the second transceiver is altered or conditioned, are indicators of the nature and character of the material stored in the pores of the geologic formation of interest.

The spacing between the first transceiver, used to generate a signal, and a second transceiver used to detect the altered or conditioned signal returned by the formation provides an indication of the distance from the tool and into the geologic formation to which the altered or conditioned signal pertains. For example, but not by way of limitation, a first transceiver positioned on the tool at a distance of only 2 feet (61 cm) from the second transceiver will provide a detected signal that indicates the conditions in the geologic formation at a first distance from the tool, while a first transceiver positioned on the tool at a distance of 10 feet (305 cm) from the second transceiver will provide a detected signal that indicates the conditions in the geologic formation at a second distance from the tool that is substantially greater than the first distance. Varying the spacing between the first transceiver and the second transceiver is a method that provides a better and more detailed investigation of the components of the geologic formation both proximal to the drilled bore in which the tool resides and distal to the drilled bore.

The apparatus and system of the present invention provide a convenient solution to the need for varying the spacing of instruments on a configured well logging tool. The apparatus and system of the present invention may enable the same sub to be configured with a variety of spacings between the instruments used to generate a signal and the instruments used to detect altered or conditioned signals returning from the geologic formation of interest. In one embodiment, the sub used in the apparatus and system of the present invention comprises a bore through the sub and an exterior wall having a plurality of sets of recesses spaced along the length of the sub for use in securing instruments intermediate the sets of recesses. A plurality of sets of curved inserts are receivable into the sets of recesses to provide threads to engage internally threaded retainer rings to secure an instrument in a position on the sub. The threads of the inserts and the retainer rings are directed to be tightened by interaction between the retainer ring and the wall of the earthen bore drilled using the drill string into which the well logging tool is made up. The instrument is configurable because the coils and the antenna can be easily removed and placed at different pre-defined locations and secured through a retaining mechanism to the exterior walls of the system. The optimal choices of configurations can be made prior to the execution of a drilling job, for example, based on the rock formation properties, desirable detection range, and economic considerations such as cost.

Figure 2:
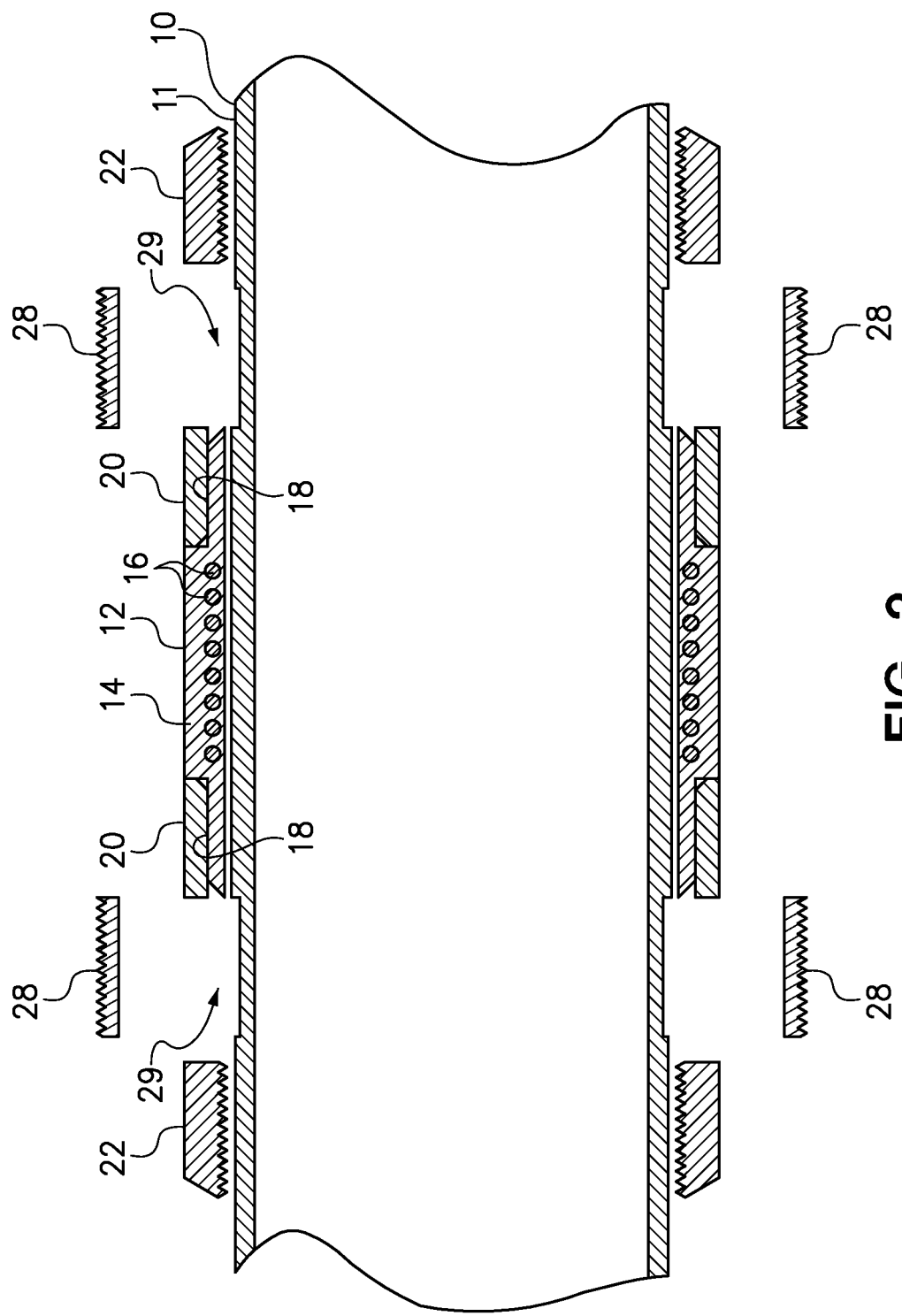
FIG. 2 is the sectioned view of FIG. 1 after wear bands are installed on shoulders of the antenna case.

FIG. 1 is a sectioned view of a sub 10 on which an antenna case 12 of an antenna assembly of the present invention is received intermediate a pair of straddling wear bands 20 and intermediate a pair of straddling retainer rings 22. The sub 10 includes a plurality of recesses 29 on an exterior wall 11 of the sub 10. The antenna case 12 includes a conductive wire coil 16 that is radially surrounded by a sacrificial wear portion 14 of the antenna case 12. The coil 16 is straddled by shoulders 18. The wear band 20 may comprise an inner end 21 that is radially inwardly tapered to steer a correspondingly radially outwardly tapered outer end 19 of the shoulder 18 into the wear band 20 as the wear band 20 is installed onto the shoulder 18 of the antenna case 12 as illustrated in FIG. 2. It will be understood that the direction or orientation of the windings of the coil 16 of FIG. 1 is merely for purposes of illustration, and other antenna assemblies may comprise coils that are wound differently than the coil 16 illustrated in FIG. 1. For example, but not by way of limitation, see the alternative toroid wound coil 16 of FIG. 14.

FIG. 2 is the sectioned view of FIG. 1 after wear bands 20 are installed on shoulders 18 of the antenna case 12 to radially surround the shoulders 18 and to axially straddle the sacrificial wear portion 14 that surrounds the coil 16 of the antenna case 12. A plurality of inserts 28 are positioned adjacent to recesses 29 in the exterior wall 11 of the sub 10 for insertion into the recesses 29 to cooperate with the retainer rings 22.

Figure 3:
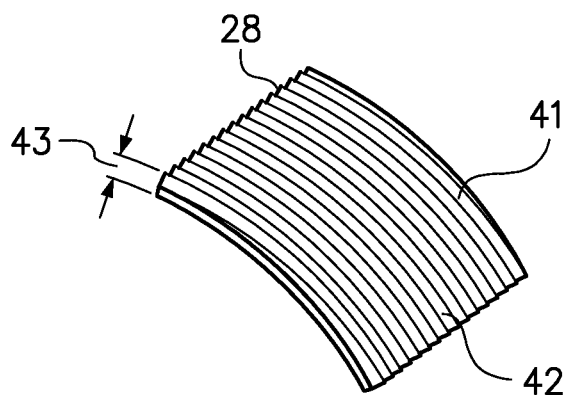
FIG. 3 is a perspective view of a threaded exterior side of an insert formed for being received in a recess in the exterior wall of the sub of FIGS. 1 and 2 to cooperate with retainer rings to secure the completed antenna assembly.
Figure 4:
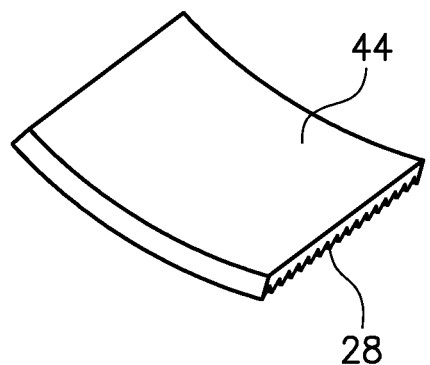
FIG. 4 is a perspective view of an interior side of the insert of FIG. 3.

FIG. 3 is a perspective view of a threaded exterior side 42 of an insert 28 having a thickness 43 and formed for being received in a recess 29 (not shown in FIG. 3—see FIG. 2) in the exterior wall 11 of the sub 10 of FIG. 2 to cooperate with retainer rings 22 to secure the completed antenna assembly. The threaded exterior side 42 of the insert 28 comprises a plurality of threads 41 that may be right-handed threads or left-handed threads for receiving a retainer ring 22 having corresponding threads. It will be understood that, in one embodiment, the thickness 43 of the insert 28 is the same as the depth of the recesses 29 in the exterior wall 11 of the sub 10 (see FIGS. 1 and 2) so that the threads 41 on the exterior side 42 of the insert 28 will extend radially beyond the exterior wall 11 of the sub 10 when the inserts 28 are received within the recesses 29 to cooperate with the retainer rings 22. FIG. 4 is a perspective view of an interior side 44 of the insert 28 of FIG. 3. The interior side 44 of the insert 28 engages the recess 29 into which the insert 28 is received on the exterior wall 11 of the sub 10.

Figure 5:
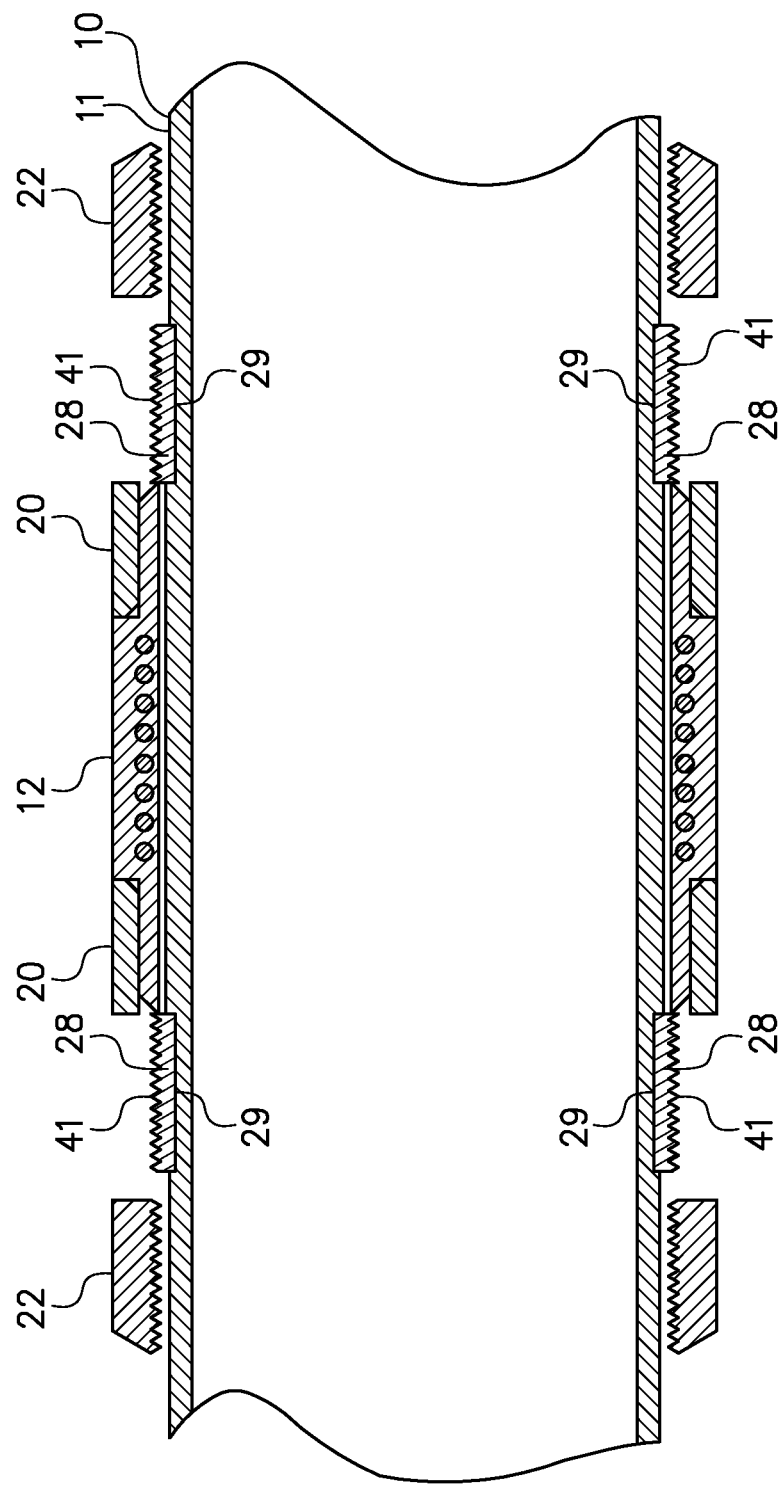
FIG. 5 is the sectioned view of FIG. 2 after the inserts are received into recesses in the exterior wall of the sub on which the antenna assembly is to be completed.

FIG. 5 is the sectioned view of FIG. 2 after the inserts 28 are received into recesses 29 in the exterior wall 11 of the sub 10 on which the antenna case 12 is received. The threads 41 on the insert 28 are positioned adjacent to the shoulders 18 of the antenna case 12 and adjacent to the wear bands 20 received thereon. The retainer rings 22 are threadably received on the sub 10 adjacent to the inserts 28 in the recesses 29.

Figure 6:
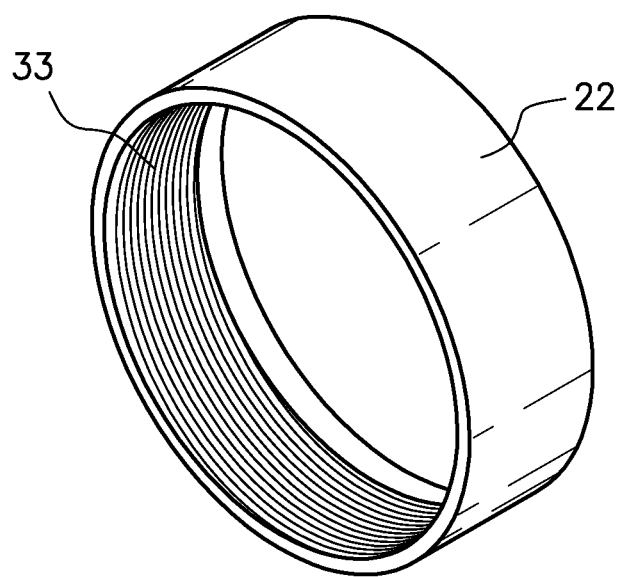
FIG. 6 is a perspective view of the retainer ring of FIGS. 1 and 2 that can be used to secure the completed antenna assembly of the present invention on a pipe.

FIG. 6 is a perspective view of a retainer ring 22 that can be used in conjunction with the inserts 28 of FIGS. 3 and 4 and the recesses 29 of FIGS. 1, 2 and 5 to secure the antenna case 12 of the present invention on the sub 10. The interior threads 33 correspond to the threads 41 on the exterior side 42 of the inserts 28 received into the recesses 29 of the sub 10.

Figure 7:
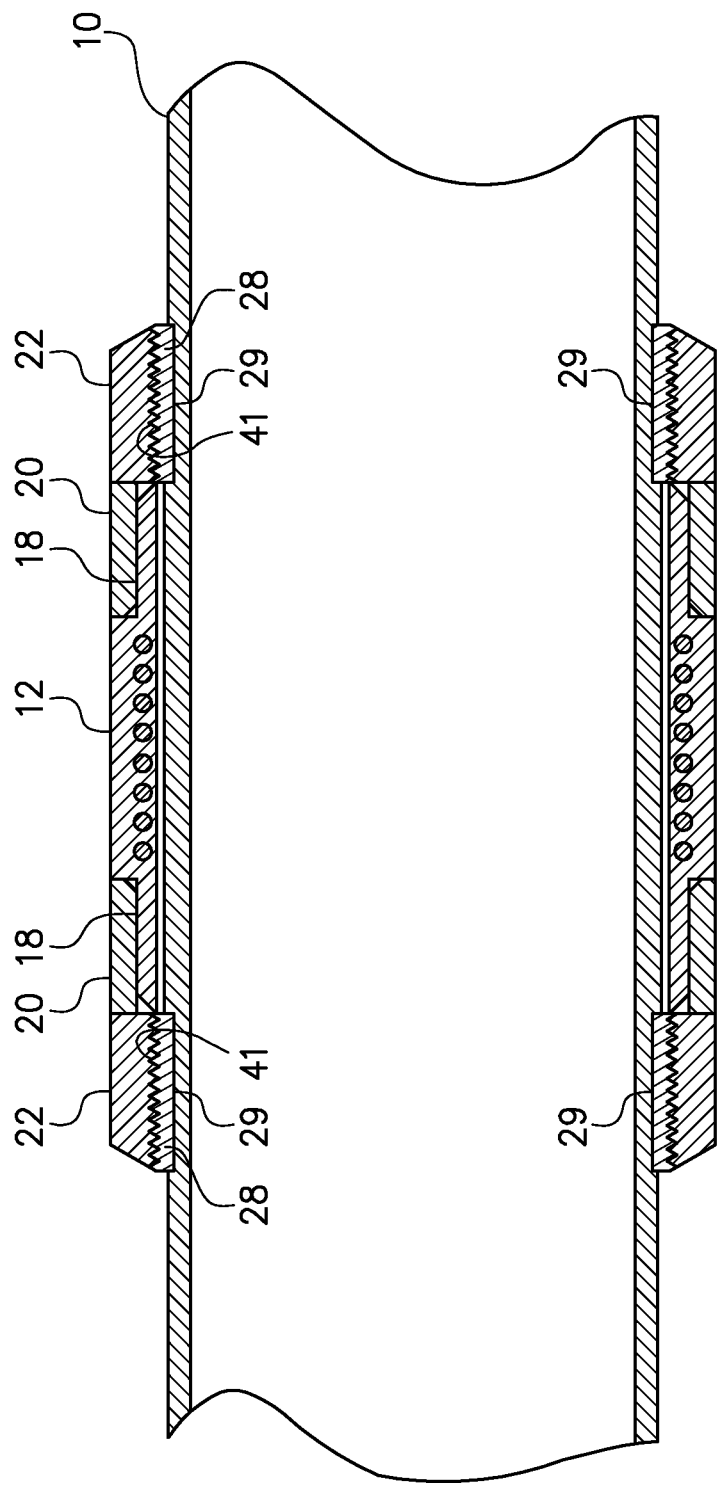
FIG. 7 is the sectioned view of FIG. 5 after the straddling retainer rings are threadably received onto the threads of the inserts to secure the antenna case on the sub.

FIG. 7 is the sectioned view of FIG. 5 after the straddling retainer rings 22 are threadably received onto the threads 41 of the inserts 28 to secure the wear bands 20 on the shoulders 18 of the antenna case 12 and to secure the antenna case 12 on the sub 10.

Figure 8:
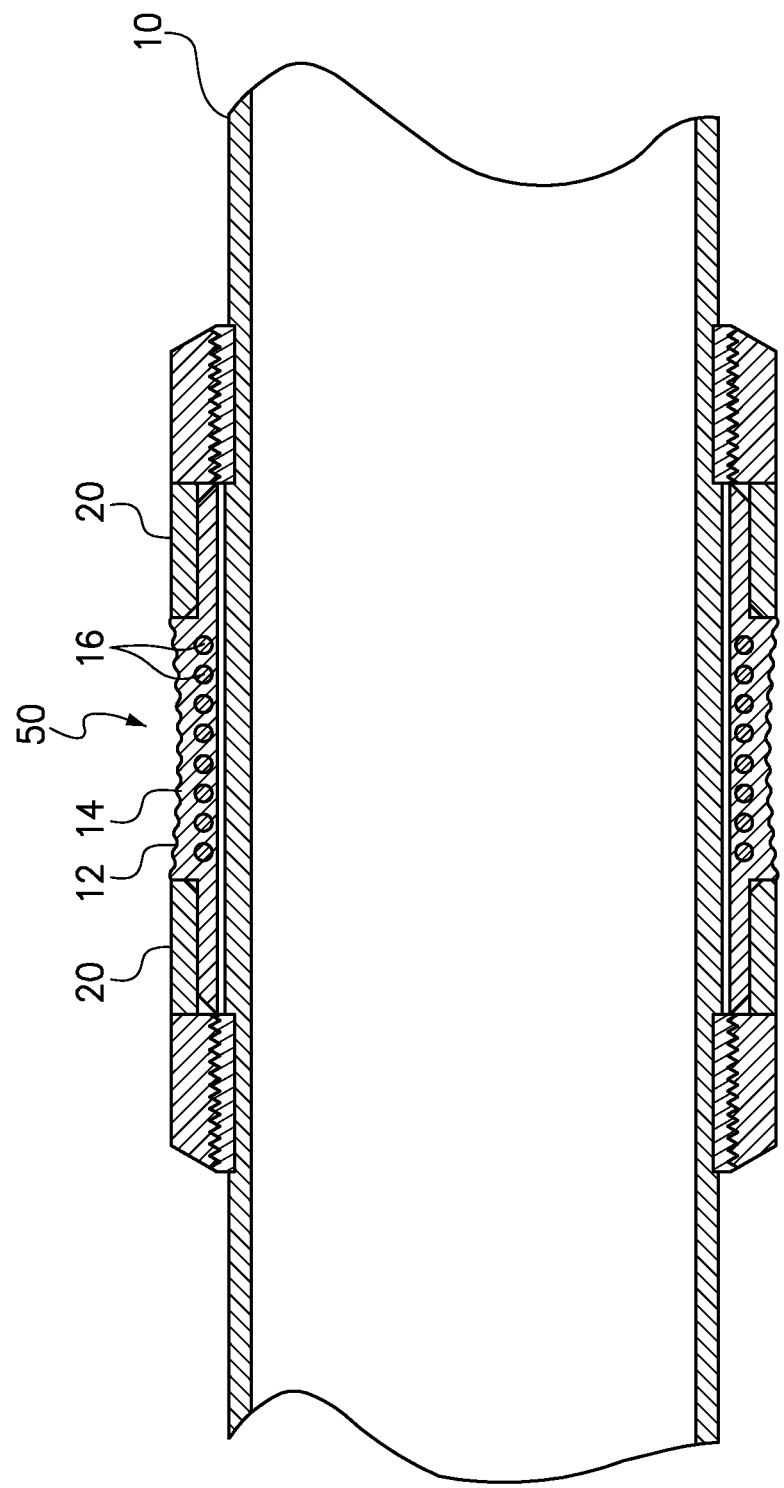
FIG. 8 is the sectioned view of the completed antenna assembly illustrating the sacrificial erosive loss of material of the antenna case surrounding the coil of the antenna assembly resulting from running the sub in a drill string into an earthen borehole for logging while drilling operations.

FIG. 8 is the sectioned view of the secured antenna assembly of FIG. 7 illustrating sacrificial erosive loss 50 of material at the sacrificial portion 14 surrounding the coil 16 of the antenna case 12 resulting from running the sub 10 in a drill string (not shown) into an earthen borehole (not shown) for logging while drilling operations. It will be understood that rotating the drill string within an earthen bore during logging while drilling operations causes substantial abrasion and wear on the radially outwardly disposed surfaces of all components of the drill string, including the sacrificial portion 14 of the antenna case 12. While most components of the drill string are comprised of very hard and wear-resistant metal, such as steel, those materials would obstruct the passage of a signal of the kind used to investigate geologic formations of interest if used to surround and protect the antenna case 12. The antenna case 12 of the present invention is designed to accommodate wear and erosion of the signal-compatible sacrificial portion 14 of the antenna case 12 without compromising the function and performance of the antenna case 12.

Figure 9:
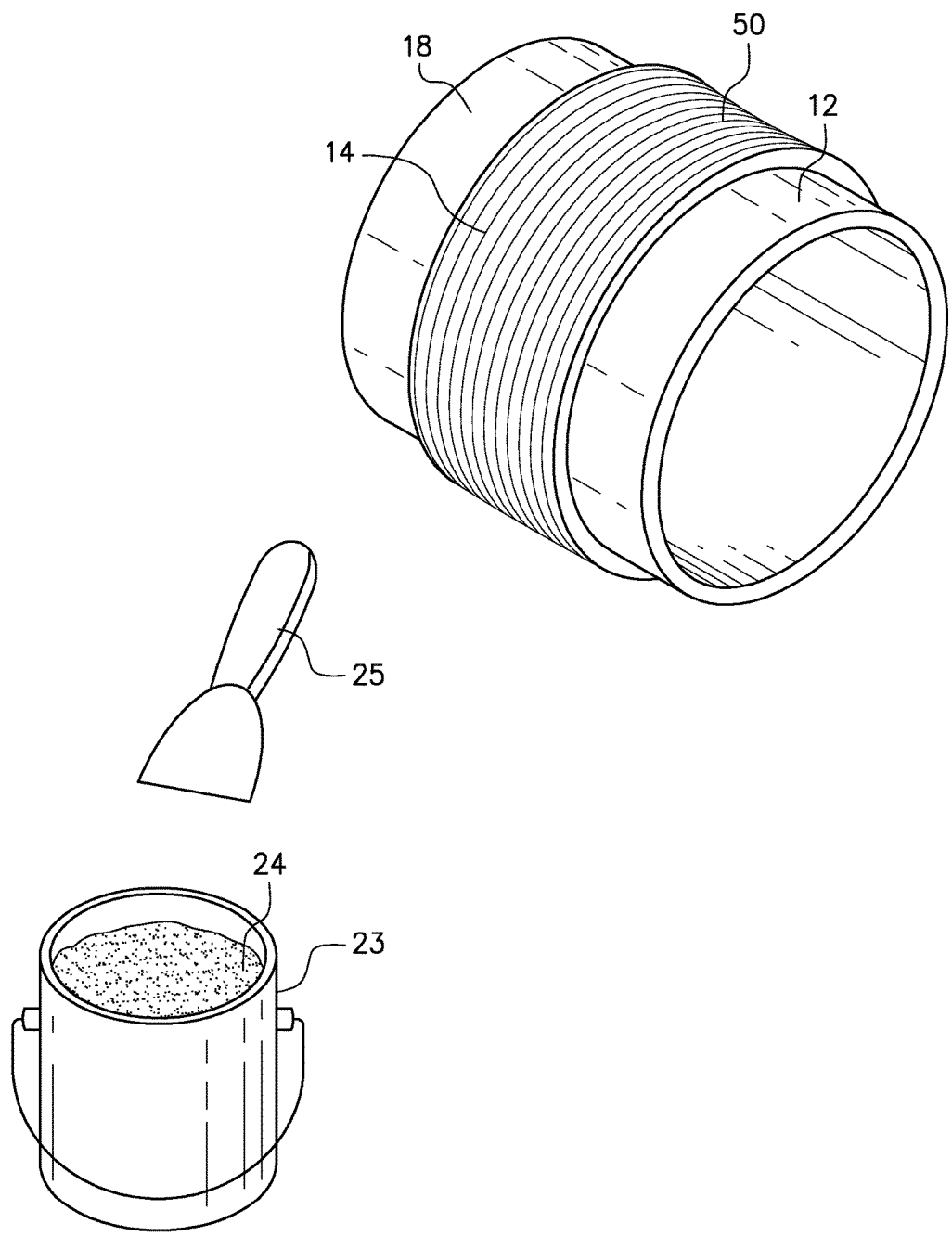
FIG. 9 is a perspective view of an implement being used to apply an uncured restorative material to the eroded sacrificial portion of the antenna case surrounding the coil of the antenna case.

FIG. 9 is a perspective view of an implement 25 being used to apply an uncured restorative material 24 to the eroded portion 50 of the sacrificial portion 14 of the antenna case 12 in which the coil 16 (not shown in FIG. 9) is encased. The uncured restorative material 24 is illustrated as being provided in a closable and sealable container 23 and applied to an eroded portion 50 of the sacrificial portion 14 of the antenna case 12, intermediate the straddling shoulders 18 of the antenna case 12, to restore the radially outwardly disposed surface of the sacrificial portion 14 to or near its original configuration illustrated in FIGS. 1, 2, 5 and 7.

Figure 10:
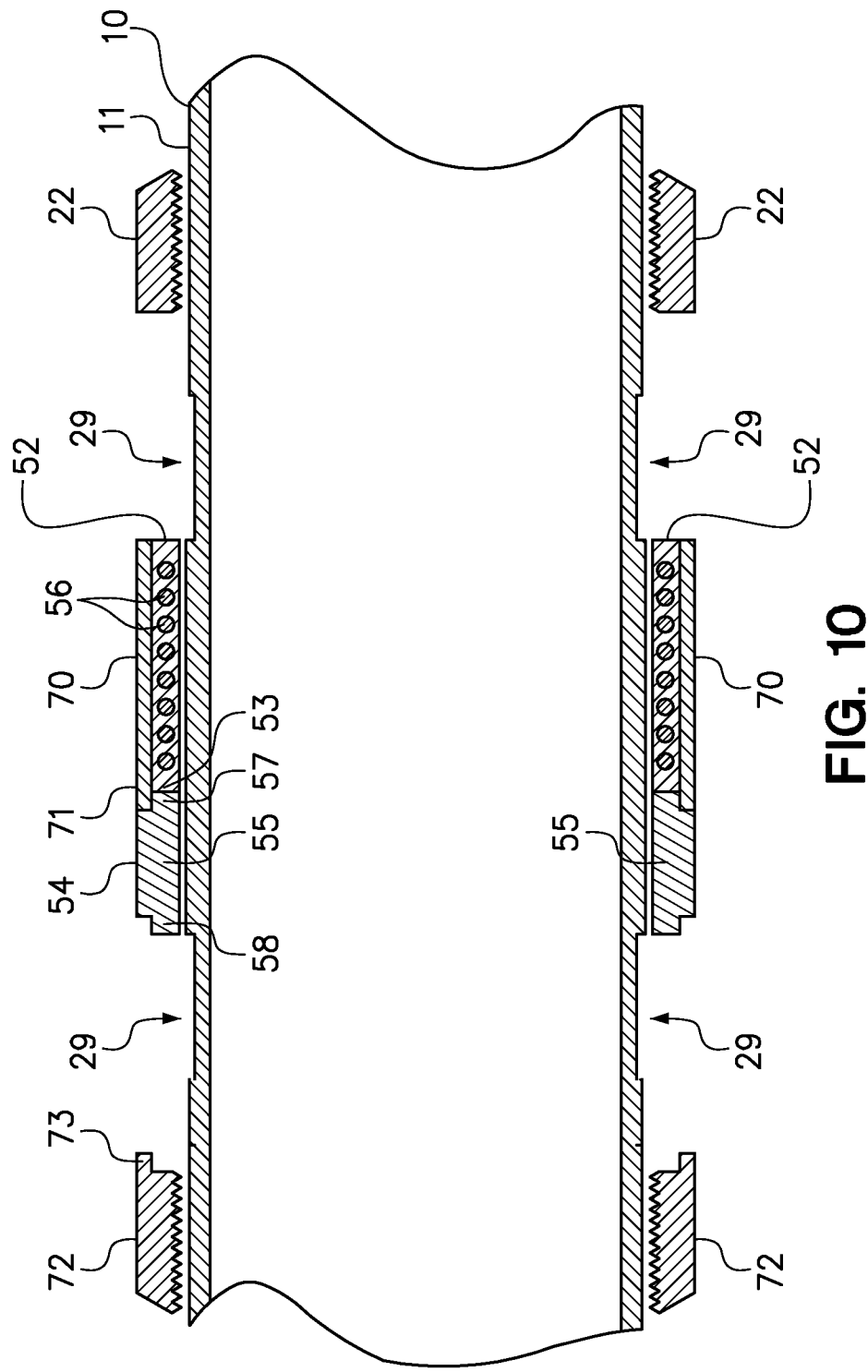
FIG. 10 is a sectioned view of an alternative embodiment of a restorable antenna assembly having an antenna case containing a coil encased within a non-signal obstructing material that is surrounded by a metal shield sleeve and secured on a sub adjacent to a bifurcated sacrificial wear member.

FIG. 10 is a sectional view an alternative embodiment of a restorable antenna assembly having an antenna case 52 comprising a coil 56 encased within a signal compatible (non-obstructing) material 53 and surrounded by a shield sleeve 70, which may be a conductive and signal-incompatible material such as steel. The antenna case 52 and the shield sleeve 70 are received and secured on an exterior wall of a sub 10 adjacent to an embodiment of a sacrificial wear member 54. In the embodiment illustrated in FIG. 10, the sacrificial wear member 54 is a bifurcated sacrificial wear member 54 comprising two semi-circular pieces, each having a pair of faces 55 at which the semi-circular sacrificial wear member 54 abuts with a mating semi-circular sacrificial wear member 54 (not shown) to together form a circular sacrificial wear member that surrounds the sub 10 and abuts the antenna case 52 that encases the coil 56. In the embodiment of the sacrificial wear member 54 of FIG. 10, the shield sleeve 70 includes a protruding portion 71 that extends beyond the antenna case 52. The sacrificial wear member 54 includes a first axially protruding lip 57 received radially within the protruding portion 71 of the shield sleeve 70. The sacrificial wear member 54 also includes a second axially protruding lip 58 extending opposite the first axially protruding lip 57 to be received within a protruding portion 73 extending from a retainer ring 72 that is slidable along the sub 10 to engage the second axially protruding lip 58 of the sacrificial wear member 54 adjacent to a recess 29 in the exterior wall.

Figure 11:
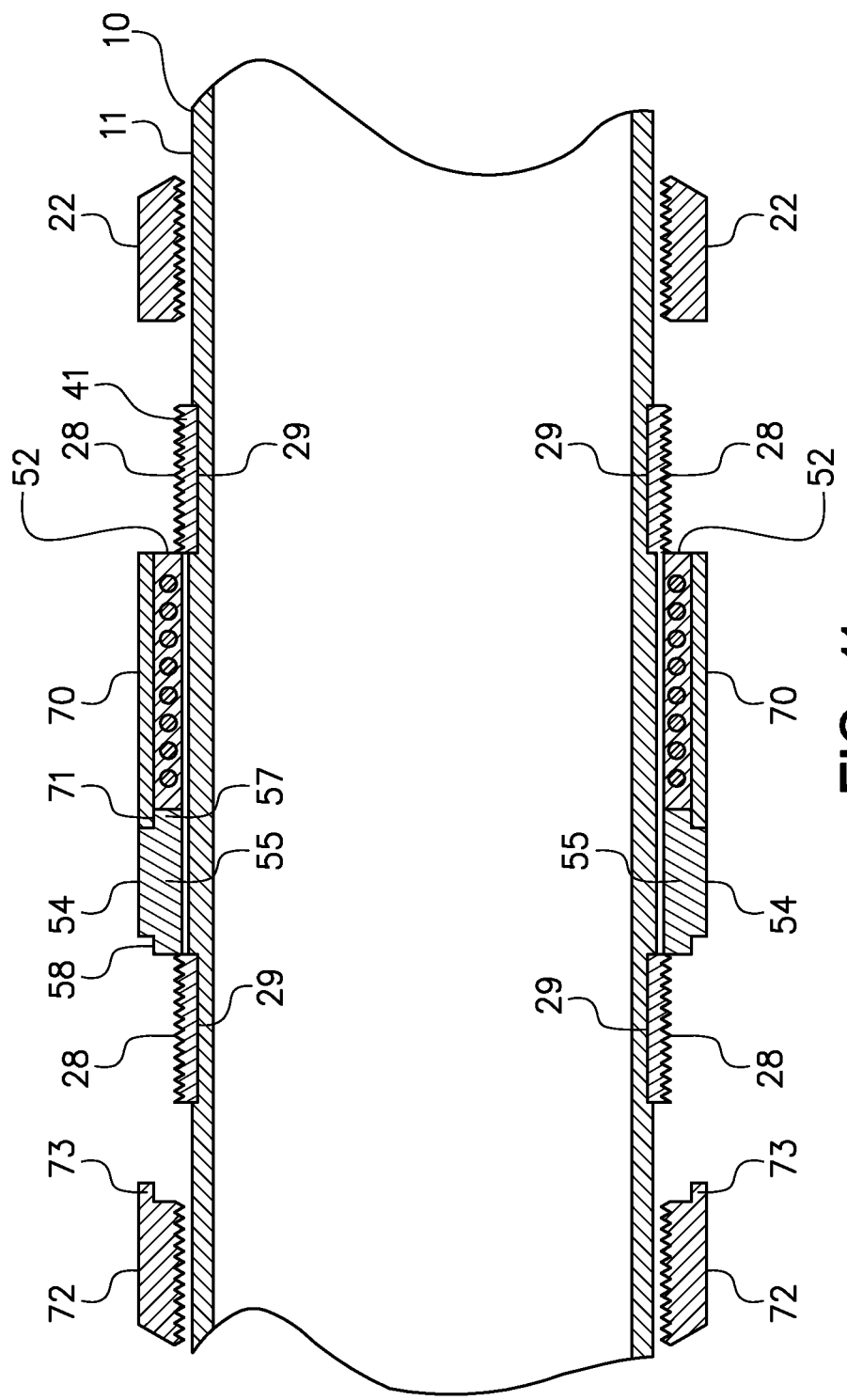
FIG. 11 is the restorable antenna assembly of FIG. 10 after inserts are received into the recesses in the exterior of the sub that straddle the antenna case, the shield and the bifurcated sacrificial wear member disposed on the sub adjacent to the antenna case.

FIG. 11 is the restorable antenna assembly of FIG. 10 after inserts 28 are received into recesses 29 in the exterior 11 of the sub 10 that straddle both the antenna case 52 and the bifurcated sacrificial wear member 54 disposed on the sub 10 adjacent to the antenna case 52. The inserts 28, as they do in the embodiment of the present invention illustrated in FIGS. 1, 2, 5 and 7-8, provide threads 41 (see FIGS. 3 and 4) for threadably securing retainer rings 22 and 72 without impairing the slidable positioning of the antenna case 52 which has a bore sized to slide along the length of the sub 10 but not large enough to clear the threads 41 on the inserts 28 received in recesses 29.

Figure 12:
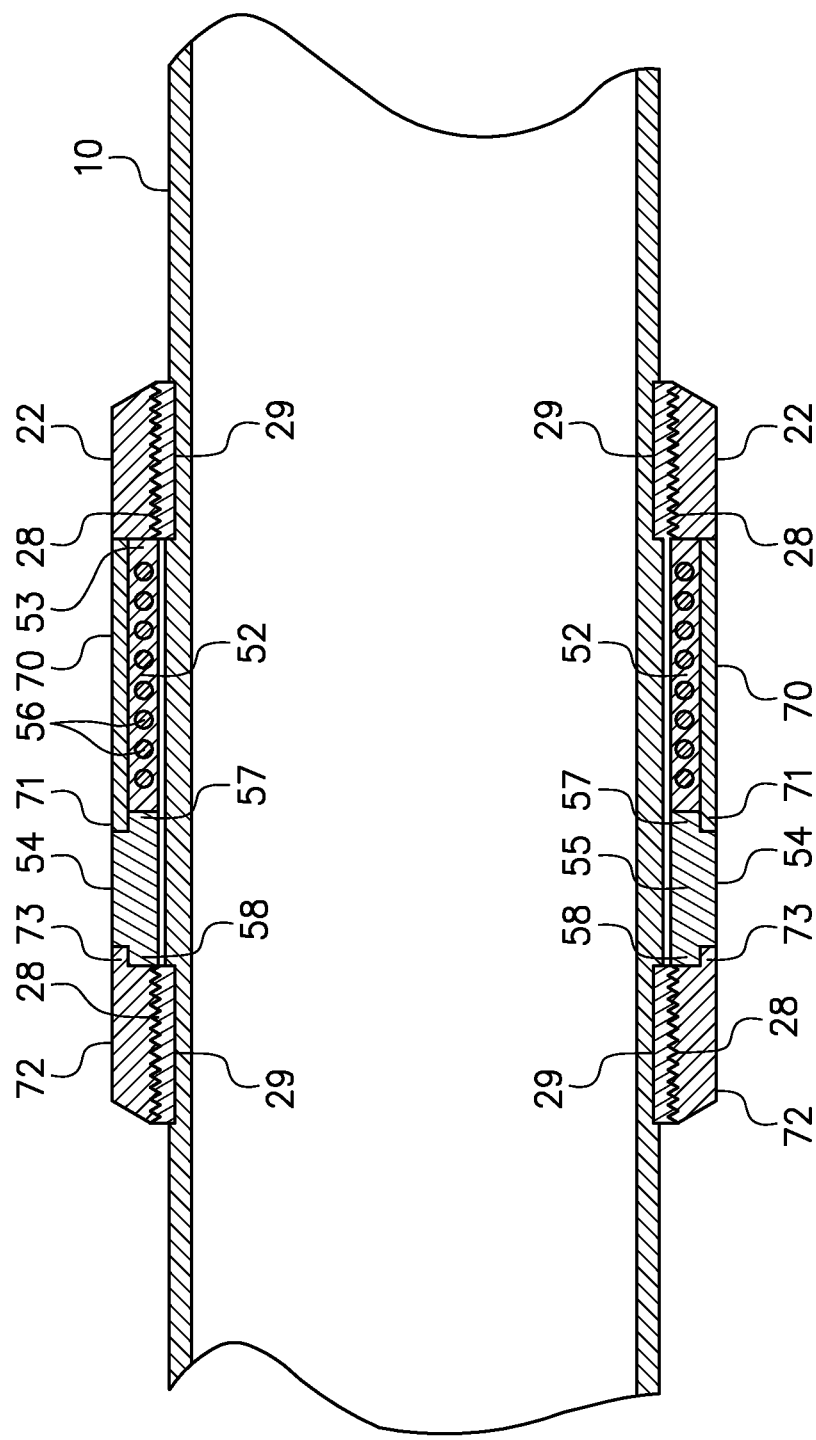
FIG. 12 is the restorable antenna assembly of FIGS. 10 and 11 after a first retainer ring and the second retainer ring are threaded onto adjacent inserts to secure the completed antenna assembly on the sub.

FIG. 12 is the restorable antenna assembly of FIGS. 10 and 11 after retainer ring 22 and retainer ring 72 are threaded onto the adjacent inserts 28 to secure the antenna assembly on the sub 10. In the configuration illustrated in FIG. 12, the antenna case 52 is radially protected within the surrounding shield sleeve 70, but a signal can be transmitted from the coil 56 through the non-signal obstructing material(s) 53 of the antenna case 52 and of the adjacent sacrificial wear member 54 and into a geologic formation of interest (not shown) adjacent to an earthen bore in which the sub 10 and the antenna assembly of FIGS. 10-12 are disposed. Alternatively, a signal from a geologic formation of interest can be detected for processing and analysis using the sub 10 and the antenna assembly of FIGS. 10-12 because the signal introduced into and conditioned by the components of the geologic formation of interest can be received through the non-signal obstructing material of the sacrificial wear member 54, through the non-signal obstructing material(s) 53 of the antenna case 52, and to the coil 56 therewithin.

It will be understood that other elements and features of a well logging tool that may be involved in the generation of a signal at the coil 56, or in the sensing and detection of a signal at the coil 56, are not illustrated in the appended drawings because these elements and features are not involved in the securing of the antenna assembly to the sub 10 or in the replacement or restoration of a sacrificial wear portion 14 and sacrificial wear member 54. Such elements and features include, but are not limited to, electrically conductive leads to and from the coil 56, processors, amplifiers, switches, relays, batteries, fuel cells, magnets, electromagnets, and the like.

It will be understood that the method, apparatus and system of the present invention are illustrated herein using a uniformly wound coil 56 within a sleeve-shaped antenna case 12 and 52, but the method, apparatus and system of the present invention are equally useful for securing an antenna case having a conductive element, such as a wire, wound in a toroid configuration.

Figure 13:
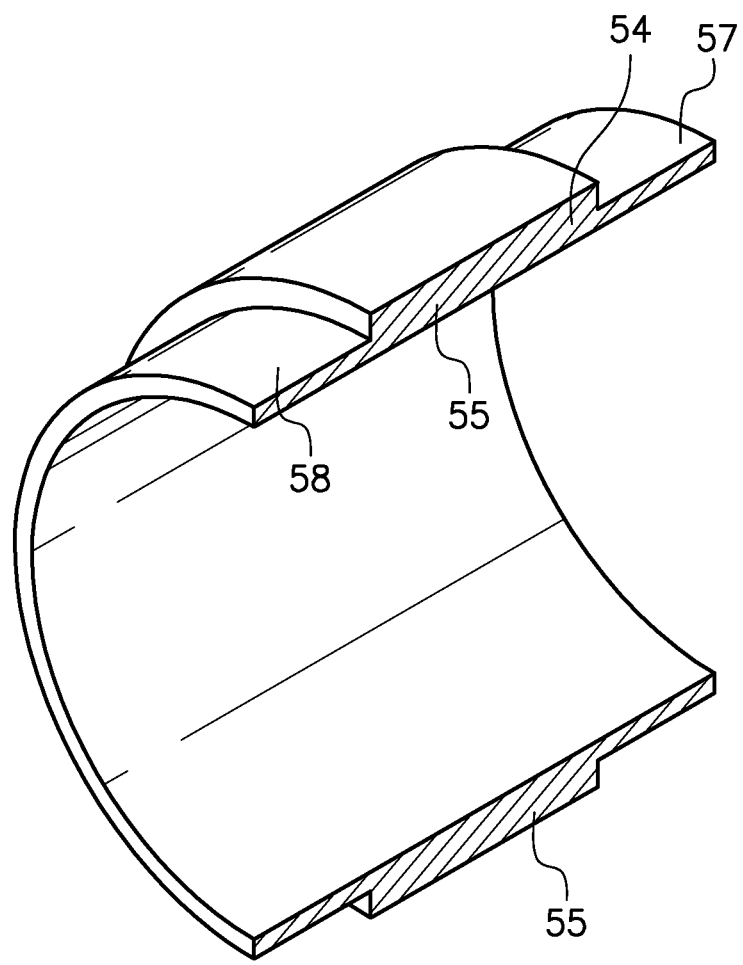
FIG. 13 is a perspective view of one of the two bifurcated portions of the embodiment of the sacrificial wear member of the antenna assembly illustrated in FIGS. 10-12.

FIG. 13 is a perspective view of one of the two bifurcated portions of the embodiment of the sacrificial wear member 54 of the antenna assembly illustrated in FIGS. 10-12. The sacrificial wear member 54 includes a pair of faces 55, a first protruding lip portion 57 (to interact with the protruding portion 71 of the shield sleeve 70) and a second protruding lip portion 58 (to interact with the protruding portion 73 of the retainer ring 72).

It will be understood that the features described above, including the protruding portion 71 of the shield sleeve 70, the first axially protruding lip 57 of the sacrificial wear member 54, the protruding portion 73 of the retainer ring 72 and the second axially protruding lip portion 58 of the sacrificial wear member 54, cooperate to secure the two bifurcated sacrificial wear member 54 in abutment one with the other and both intermediate the antenna case 52 and the retainer ring 72. It will be further understood that these features will similarly cooperate to secure the sacrificial wear member 54 intermediate the antenna case 52 and the retainer ring 72 if the sacrificial wear member 54 were to comprise three pieces, four pieces or more. Each piece of the sacrificial wear member 54 should include an arc span of 180 degrees or less in order to enable the sacrificial wear member 54 to be removed from and installed on the sub 10 without requiring the removal from the sub 10 of the retainer ring 72, the opposite retainer ring 22, the antenna case 52 or the shield sleeve 70. With each piece of the sacrificial wear member 54 having 180 degrees or less of arc span, the sacrificial wear member 54 can be conveniently radially removed and radially installed by simply unthreading the retainer ring 72 from the insert 28 onto which it is threaded in FIG. 12, sliding the retainer ring 72 axially along the sub 10 to the removed position illustrated in FIG. 11 and, if needed, by removing the insert 28 from the recess 29 in the exterior wall 11 of the sub 10, to release the sacrificial wear member 54 for removal and replacement with new pieces.

Figure 14:
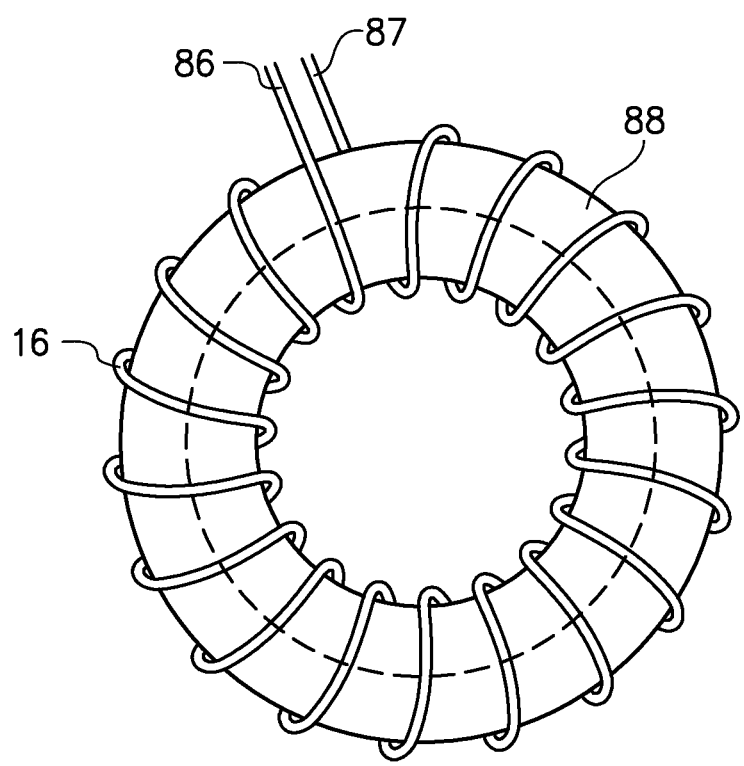
FIG. 14 is a prior art plan view of the conductive wire of a toroidal antenna case.

FIG. 14 is a plan view of an antenna with a conductive wire 16 wound in a toroid configuration on a circular body 88. The conductive wire 16 comprises a first lead 86 and a second lead 87. It will be understood that the apparatus, system and method of the present invention may be used with a wide range of antenna types.

Figure 15:
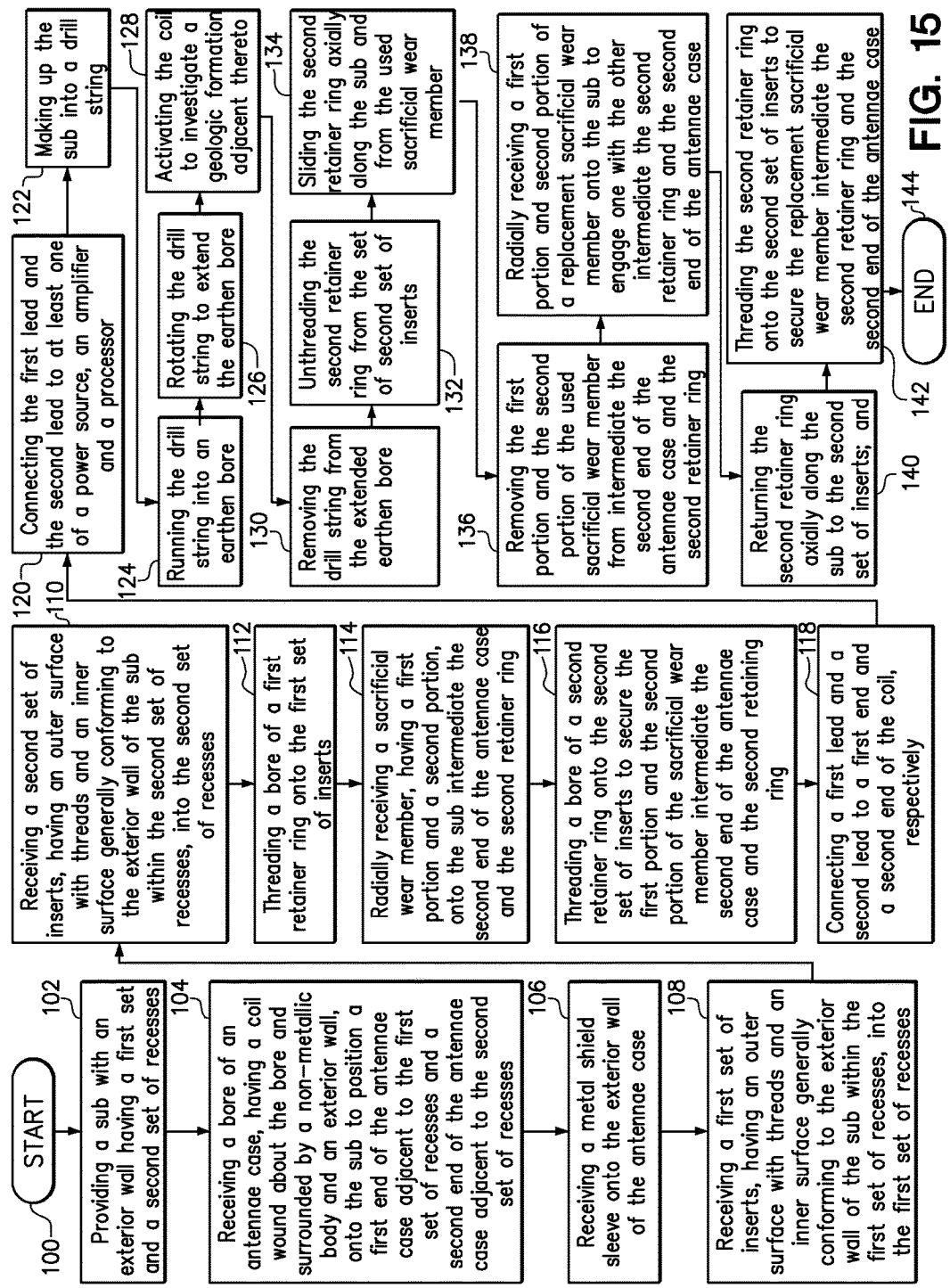
FIG. 15 is a high level flow chart illustrating the steps for reusing the antenna case in the antenna assembly illustrated in FIGS. 10-13.

FIG. 15 is a high level flow chart illustrating the steps of an embodiment for reusing an antenna case in an antenna assembly illustrated in FIGS. 10-12. The embodiment of the method illustrated in FIG. 15 starts at step 100, and in step 102, a sub with an exterior wall having a first set and a second set of recesses is provided. In step 104, a bore of an antenna case, having a coil wound about the bore and surrounded by a non-metallic body and an exterior wall, is received onto the sub to position a first end of the antenna case adjacent to the first set of recesses and a second end of the antenna case adjacent to the second set of recesses. It will be understood that the antenna case has a bore that is larger in diameter than the diameter of the sub, but not large enough to clear the threaded surface of the inserts when the inserts are received into the recesses in the exterior wall of the sub, as will be discussed in connection with steps 108 and 110 below. In step 106, a metal shield sleeve is received onto the exterior wall of the antenna case. It will be understood that the shield sleeve in the embodiment of the method illustrated in FIG. 15 is metal due to the favorable wear resistance of metals, such as steel. Other embodiments may utilize shield sleeves of other materials. In step 108, a first set of inserts, having an outer surface with threads and an inner surface generally conforming to the exterior wall of the sub within the first set of recesses, are received into the first set of recesses and, in step 110, a second set of inserts, having an outer surface with threads and an inner surface generally conforming to the exterior wall of the sub within the second set of recesses, are received into the second set of recesses. It will be understood that the first set of recesses may be, in some embodiments of the method, identical in size and shape to the second set of recesses and, similarly, the first set of inserts may be identical in size and shape to the second set of inserts. In some embodiments, the threads on the outer surfaces of the first set of inserts may be left-handed threads and the threads on the second set of inserts may be left-handed threads. It will be further understood that this arrangement may be obtained by simply orienting the inserts to orient the threads as desired when receiving the inserts into the recesses on the exterior wall of the sub.

In step 112 of the embodiment of the method illustrated in FIG. 15, a bore of a first retainer ring is threaded onto the first set of inserts. It will be understood that the internal threads of the bore of the first retainer ring must be oriented to correspond with the orientation of the threads on the outer surface of the first set of inserts received into the first set of recesses in the exterior wall of the sub. In step 114, a first portion and a second portion of a sacrificial wear member are radially received onto the sub intermediate the second end of the antenna case and the second retainer ring. It will be understood that, where the first portion and the second portion are each generally semi-circular, for example, having an arc span of 180 degrees each, then the sacrificial wear member will comprise only the first portion and the second portion. Other embodiments of the method may include the step of radially receiving, for example, three portions of the sacrificial wear member, each having an arc span of 120 degrees. In still other embodiments of the method of the present invention, the plurality of portions that make up the sacrificial wear member may not have equal arc spans. For example, a sacrificial wear member could, in one embodiment, be installed by receiving a first and a second portion, each having a 130 degree arc span, and a third portion having a 100 degree arc span onto the sub intermediate the second end of the antenna case and the second retainer ring. It will be understood that the sum of the arc spans of the plurality of portions of the sacrificial wear member should be about 360 degrees and that no portion should exceed 180 degrees in order to facilitate radial installation onto the sub, thereby permitting ease of removal and ease of installation of the sacrificial wear member of the antenna assembly.

In step 116, a bore of a second retainer ring is threaded onto the second set of inserts to secure the first portion and the second portion of the sacrificial wear member intermediate the second end of the antenna case and the second retainer ring. It will again be understood that the internal threads of the bore of the second retainer ring must, like those of the first retainer ring, be oriented to correspond with the orientation of the threads on the outer surface of the second set of inserts received into the second set of recesses in the exterior wall of the sub. In step 118, a first lead and a second lead are connected to a first end and a second end of the coil, respectively, and in step 120, the first lead and the second lead are connected to at least one of a power source, an amplifier and a processor. It will be understood that the power source, the amplifier and/or the processor are used to either generate, condition or receive a signal transmitted from or detected by the coil of the antenna case, and that other components may also be included on the sub to provide function. In step 122, the sub is made up into a drill string. It will be understood that the sub comprises connections at each end to facilitate the inclusion of the sub into a drill string that may include one or more of joints of pipe, drill pipe, drill collars, a mud motor, and other drill string components. In step 124, the drill string is run into an earthen bore. Running the drill string into the bore generally requires making up the drill string piecewise, or one joint or stand of pipe at a time, until the drill bit at the leading end of the drill string reaches the portion of the bore to be extended. In step 126, the drill string is rotated to extend the earthen bore. It will be understood that, in other embodiments of the method, only a portion of the drill string forward of a mud motor may be rotated to extend the bore. In step 128, the coil of the antenna case is activated to investigate a geologic formation adjacent thereto. It will be understood that the coil may be activated, for example, using a power source to generate a signal that is transmitted from the coil, through the antenna case and into the formation of interest adjacent to the sub or, for example, the coil may be activated by detecting a signal that has been conditioned by the formation of interest and the signal may be routed to a processor or an amplifier for analysis or further conditioning to facilitate interpretation of the signal.

The sacrificial wear member of the antenna assembly used in accordance with the embodiment of the method illustrated in FIG. 15 will be subjected to abrasion and wear as the drill string is rotated in the bore to extend the bore. Periodically, the drill string must be removed from the bore for servicing or for other downhole operations that require removal of the drill string. Removal of the drill string from the bore provides an operator an opportunity to restore the antenna assembly to a favorable condition and to replace any worn or eroded components therein.

In step 130, the drill string is removed from the extended earthen bore, and in step 132, the second retainer ring is unthreaded from the set of second set of inserts. In step 134, the second retainer ring is slid axially along the sub and from the used sacrificial wear member. It will be understood that movement of the second retainer ring away from the sacrificial wear member enables the sacrificial wear member to be radially removed from the sub without the necessity of removing other components of the antenna assembly from the sub. In step 136, the first portion and the second portion of the used sacrificial wear member are removed from intermediate the second end of the antenna case and the second retainer ring and, in step 138, a first portion and a second portion of a replacement sacrificial wear member are radially received onto the sub to engage one with the other intermediate the second retainer ring and the second end of the antenna case. In step 140, the second retainer ring is returned axially along the sub to the second set of inserts and, in step 142, the second retainer ring is threaded onto the second set of inserts to secure the replacement sacrificial wear member intermediate the second retainer ring and the second end of the antenna case.

It will be understood that the sacrificial wear member, having a plurality of portions, requires some structure to enable the sacrificial wear member to be retained on the sub, but conveniently removed from the sub and replaced with a replacement sacrificial wear member without the complete removal of other components of the antenna assembly from the sub. The embodiment of the method illustrated in FIG. 15 may, in one embodiment, include the modified step 106 of receiving a metal shield sleeve onto the exterior wall of the antenna case in an expanded form wherein the step includes receiving the shield sleeve onto the exterior wall of the antenna case with an end of the shield sleeve extending beyond the second end of the antenna case to provide a groove radially intermediate the exterior wall of the sub and an inner wall of the metal shield sleeve. The embodiment illustrated in FIG. 15 may further include the modified step 114 of radially receiving a first portion and a second portion of a replacement sacrificial wear member onto the sub to engage one with the other intermediate the second retainer ring and the second end of the antenna case wherein the step includes radially receiving a first portion and a second portion of a replacement sacrificial wear member onto the sub to engage one with the other intermediate the second retainer ring and the second end of the antenna case to position a lip protruding from the first portion and the second portion into axial alignment with the annular groove intermediate the exterior wall of the sub and an inner wall of the shield sleeve. It will be understood that this embodiment of the method will enable the sacrificial wear member to be secured in a position on the sub by axially retaining the sacrificial wear member intermediate the second retainer ring and the antenna case and by radially retaining the sacrificial wear member intermediate the exterior wall of the sub and the inner wall of the shield sleeve.

The term "well logging instrument," as that term is used herein, includes, but is not limited to, a transmitter, a receiver, a transceiver, an antenna, or an electrode, and is not limited to magnetic or electromagnetic measurement. It can also be a transducer for acoustic measurement or detector or nuclear source for nuclear measurements. A transceiver is a well logging instrument that can function as either a receiver or a transmitter, depending on the mode of operation. Embodiments of the sub 10 may further comprise apertures and/or channels within the sub 10 to accommodate electrically conductive wire to, for example, provide a current to a transceiver or other well logging instrument or electronic component within a well logging instrument. A conductive wire may be used to carry an electronic signal from a well logging instrument to another well logging instrument or to a processor, relay, data storage device, amplifier, etc. In some embodiments, apertures through the wall of the sub 10 may be threaded to accommodate closure of the aperture (while not in use) using a threaded plug.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An apparatus, comprising:
an antenna assembly having a coil of electrically conductive wire beneath or adjacent to a substantially electrically non-conductive sacrificial element, wherein the sacrificial element is replaceable or restorable by application of a restorative material without removal of the coil from the antenna assembly;
a sub on which the antenna assembly is mounted, the sub having an exterior wall and two or more sets of recesses in the exterior wall, wherein each set of recesses is spaced along a longitudinal axis of the sub and each recess within any particular set of recesses is angularly distributed about the axis relative to other recesses of that particular set of recesses;
a first set of threaded inserts disposed in a first set of recesses located above the antenna assembly, the first set of recesses being selected from the two or more sets of recesses in the exterior wall of the sub, and each of the threaded inserts in the first set of threaded inserts having external threads;
a second set of threaded inserts disposed in a second set of recesses located below the antenna assembly, the second set of recesses being selected from the two or more sets of recesses in the exterior wall of the sub, and each of the threaded inserts in the second set of threaded inserts having external threads;
a first retainer ring having internal threads complementary to the threaded inserts in the first set of threaded inserts and releasably joined to the first set of threaded inserts; and
a second retainer ring having internal threads complementary to the threaded inserts in the second set of threaded inserts and releasably joined to the second set of threaded inserts;
thereby releasably securing the antenna assembly to the sub.

2. The apparatus of claim 1, wherein the sacrificial element comprises a material selected from a group consisting of an E-glass epoxy composite and an S-glass epoxy composite.

3. The apparatus of claim 1, wherein the sacrificial element comprises high-strength glass fibers, wherein each glass fiber has a diameter in the range of 5 to 25 micrometers.

4. The apparatus of claim 1, wherein the coil is embedded in a substantially electrically non-conductive material.

5. The apparatus of claim 4, wherein the coil is wound in a uniform pitch or in a toroidal structure.

6. The apparatus of claim 1, further comprising:
a first electrically conductive lead connected to a first end of the coil; and
a second electrically conductive lead connected to a second end of the coil;
wherein the first lead and the second lead connect the coil to at least one of a processor, an amplifier, and a power source.

7. The apparatus of claim 1, wherein the restorative material is a substantially electrically non-conductive material.

8. The apparatus of claim 1, further comprising a first wear-resistant band and a second wear-resistant band, wherein the coil is beneath the sacrificial element, and the first wear-resistant band and the second wear-resistant band straddle at least a portion of the sacrificial element.

9. The apparatus of claim 1, further comprising a substantially electrically conductive shield, wherein the coil is adjacent to the sacrificial element and beneath the shield.

10. The apparatus of claim 1, wherein the coil is adjacent to the sacrificial element and the sacrificial element comprises two or more mated components.

11. The apparatus of claim 1, further comprising:
a first wear-resistant band adjacent to and between an upper end of the antenna assembly and the first retainer ring; and
a second wear-resistant band adjacent to and between a lower end of the antenna assembly and the second retainer ring.

12. A method, comprising:
providing an antenna assembly having a coil of electrically conductive wire beneath or adjacent to a substantially electrically non-conductive sacrificial element, wherein the sacrificial element is replaceable or restorable by application of a restorative material without removal of the coil from the antenna assembly; a sub on which the antenna assembly is mounted, the sub having an exterior wall and two or more sets of recesses in the exterior wall, wherein each set of recesses is spaced along a longitudinal axis of the sub and each recess within any particular set of recesses is angularly distributed about the axis relative to other recesses of that particular set of recesses; a first set of threaded inserts disposed in a first set of recesses located above the antenna assembly, the first set of recesses being selected from the two or more sets of recesses in the exterior wall of the sub, and each of the threaded inserts in the first set of threaded inserts having external threads; a second set of threaded inserts disposed in a second set of recesses located below the antenna assembly, the second set of recesses being selected from the two or more sets of recesses in the exterior wall of the sub, and each of the threaded inserts in the second set of threaded inserts having external threads; a first retainer ring having internal threads complementary to the threaded inserts in the first set of threaded inserts and releasably joined to the first set of threaded inserts; and a second retainer ring having internal threads complementary to the threaded inserts in the second set of threaded inserts and releasably joined to the second set of threaded inserts; thereby releasably securing the antenna assembly to the sub;
operating the antenna assembly in an erosive environment, thereby eroding at least a portion of the sacrificial element; and
replacing the eroded sacrificial element or applying the restorative material to the eroded sacrificial element to produce a restored antenna assembly.

13. The method of claim 12, further comprising conducting further operations with the restored antenna assembly.

14. The method of claim 12, further comprising:
incorporating the sub into a drill string;
wherein the operating the antenna assembly in an erosive environment comprises making measurements while the sub is incorporated into the drill string.

15. The method of claim 14, further comprising conducting operations with the antenna assembly while drilling a borehole.

16. The method of claim 12, further comprising:
connecting a first electrically conductive lead to a first end of the coil;

connecting a second electrically conductive lead to a second end of the coil; and connecting the first lead and the second lead to at least one of a processor, an amplifier, and a power source.

17. An apparatus, comprising:
an antenna case having a coil of electrically conductive wire embedded in a signal compatible material;
an electrically conductive shield substantially circumferentially surrounding the antenna case; and
an electrically non-conductive sacrificial element that is neither disposed in nor integral to the shield, but is axially spaced from the coil and has only one end in abutting alignment with the antenna case and the shield.

18. The apparatus of claim 17, wherein the sacrificial element is replaceable or restorable.

19. The apparatus of claim 17, further comprising a retainer ring threaded onto threaded inserts carried on a drill collar, one end of the retaining ring being in abutting alignment with another end of the sacrificial element.

20. The apparatus of claim 17, wherein the sacrificial element comprises two or more mated elements.

\* \* \* \* \*